United States Patent [19]
Bozanic et al.

[11] 3,829,760
[45] Aug. 13, 1974

[54] SPIN ECHO FREQUENCY HOPPING

[75] Inventors: Donald A. Bozanic; Dickron Mergerian, both of Baltimore; Ronald W. Minarik, Lutherville; Peter H. Pincoffs, West Severna Park, all of Md.

[73] Assignee: Westinghouse Electric Corporation, Pittsburgh, Pa.

[22] Filed: Aug. 27, 1971

[21] Appl. No.: 173,491

[52] U.S. Cl. ............................ 324/.5 R, 340/173 NI
[51] Int. Cl. .......................................... G01n 27/78
[58] Field of Search .............. 324/.5 R, .5 A, .5 AC; 340/173 NI

[56] References Cited
UNITED STATES PATENTS
3,593,159  7/1971  Kaplan ........................ 340/173 NI
3,663,952  5/1972  Bozanic ........................ 324/.5 R OTHER PUBLICATIONS
D. A. Bozanic et al., – Nickle–Doped Rutile as a Spin–Echo Material – Journal of App. Physics – 11/70 – pp. 5041–5042.

Primary Examiner—Michael J. Lynch
Attorney, Agent, or Firm—J. B. Hinson

[57] ABSTRACT

A means for decreasing the time between successive spin echo sequences for a zero field spin echo system utilizing a nickel doped rutile sample by incrementally stepping or frequency hopping the RF carrier of the stored pulse over a predetermined operating frequency band and coupling each sequence to the sample before a thermal equilibrium of the spin system is reached for the immediately preceding sequence. Thus a single spin echo sample having a relatively wide bandwidth is multiplexed or time shared for a plurality of RF carrier frequencies.

9 Claims, 5 Drawing Figures

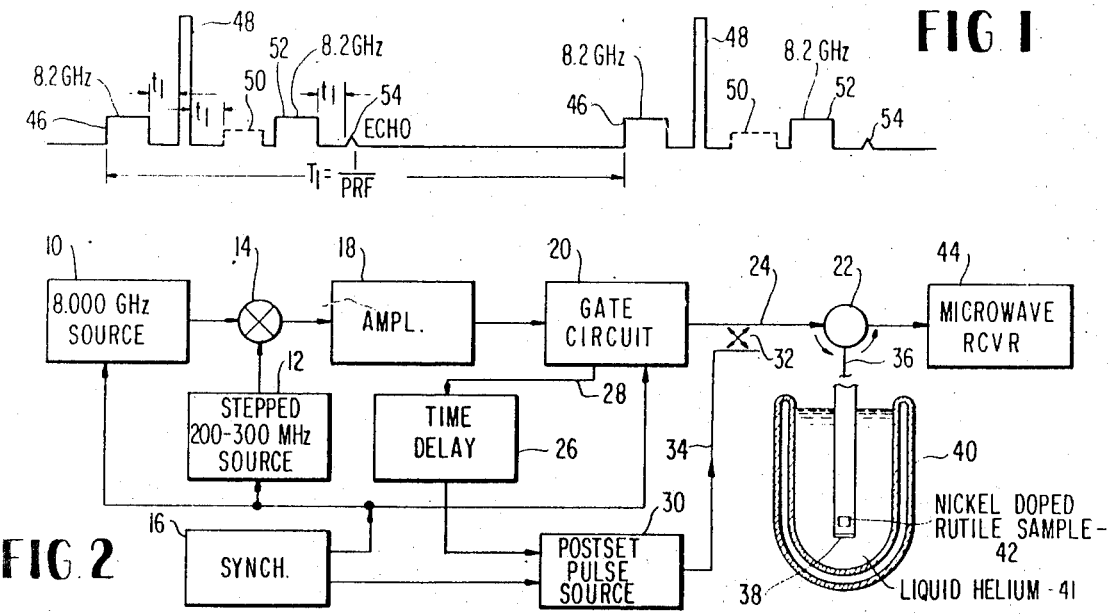
FIG. 1
FIG. 2
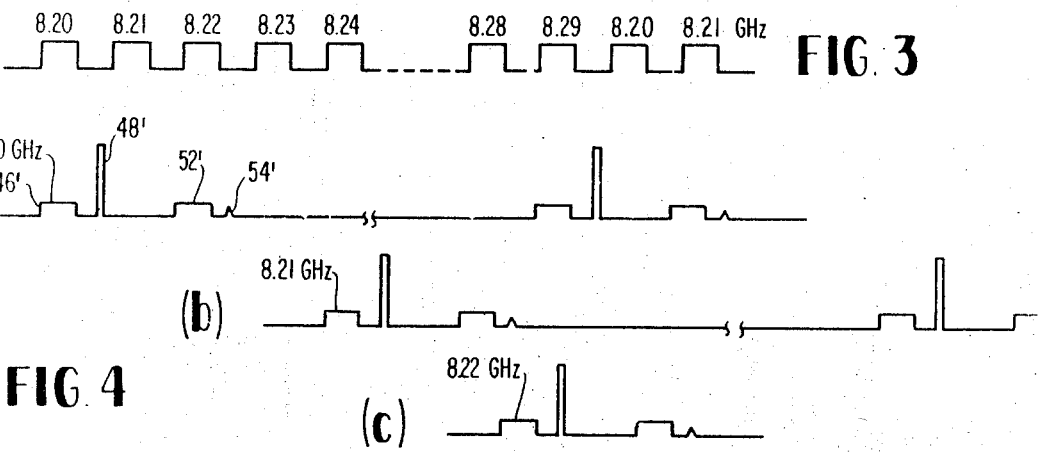
FIG. 3
FIG. 4
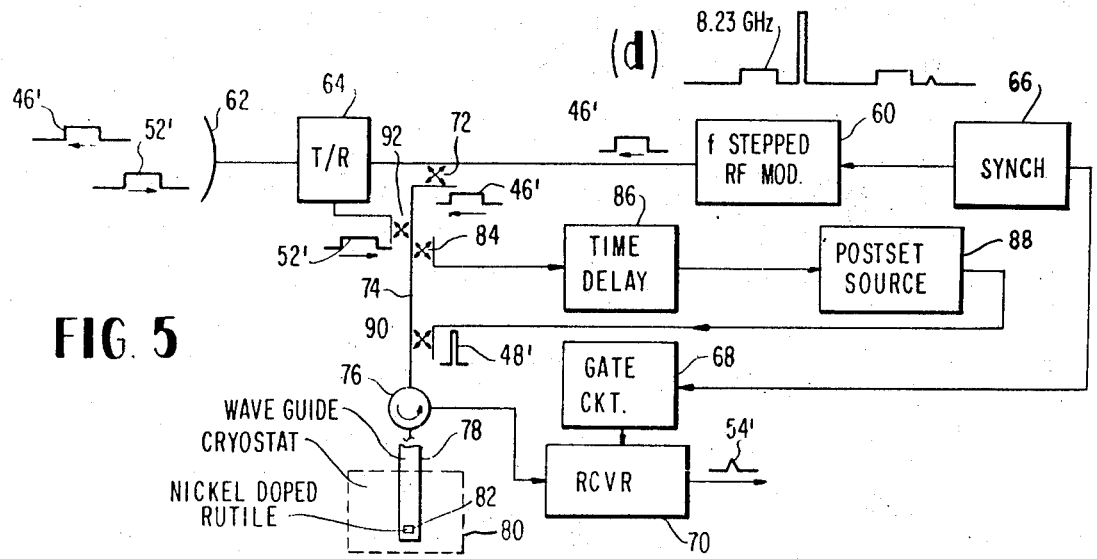
FIG. 5

SPIN ECHO FREQUENCY HOPPING

CROSS-REFERENCE TO RELATED APPLICATION

This invention is related to U.S. Ser. No. 33,201, entitled "High Bandwidth-Time Product Spin Echo System", filed Apr. 30, 1970, in the names of Donald A. Bozanic, et al. and U.S. Ser. No. 845,406 entitled "Broadband Zero Field Exchange Echo System" filed July 28, 1969 also in the names of Donald A. Bozanic, et al. These inventions are also assigned to the assignee of the present invention.

BACKGROUND OF THE INVENTION

Field of the Invention

The subject invention is directed to "spin-echo" systems utilizing a paramagnetic sample located in microwave transmission line means operated at cryogenic temperatures and more particularly to a spin echo system operating with a sample comprised of titanium dioxide (rutile) doped with nickel wherein the crystalline electric field of the rutile splits the energy level of the nickel at a predetermined frequency and spin echo signals are produced without the requirement of an external magnetic field.

Description of the Prior Art

The spin echo phenomenon normally exists when a paramagnetic sample is located in a resonant cavity situated between a homogeneous DC magnetic field such that when an input RF pulse having a frequency equal to the characteristic or "Larmor" frequency of the sample is applied at right angles to the DC magnetic field a torque is applied to the magnetic moment which causes it to be tipped away from the direction of the magnetic field. The angle of tipping, that is the angle between the moment and the direction of the field, is proportional to the magnitude of the field and the time during which the RF pulse exists. Upon release of the displacing force the spinning electrons urged again towards realignment by the force of the magnetic field rotate or precess about the field in much the same manner as a tipped gyroscope. When the sample is subsequently subjected to another RF pulse also directed normal or transverse to the magnetic field, the sample spontaneously develops a magnetic field of its own which is also normal to the magnetic field and which rotate about the latter's direction. The strength of the rotating field builds up to a maximum and then decays which is then detected as an electrical output pulse called a "spin echo" signal.

Pulsed nuclear induction spin echo systems are well known to those skilled in the art, being taught for example by U.S. Pat. No. 2,887,673 issued to E. L. Hahn. Electron spin echo systems, moreover, are taught in U.S. Pat. No. 3,129,410, issued to P. P. Sorokin. Still a later development has been the recent discovery of a zero field spin echo signal reported on March 31, 1968 by D. E. Kaplan, in a final report by the Lockheed Research Laboratory on Contract No. 2541(00). The spin echo signal was observed at zero field utilizing $CaF_2$ doped with 0.1–0.5 percent of $Ce^{3+}$.

Additionally, a system for the generation of a signal similar to a spin echo signal without the need for an external magnetic field has been developed by The Westinghouse Electric Corporation utilizing a very heavily doped sample of paramagnetic material such as rutile doped with iron group transition metal ions wherein the doping concentration is in the order of $1 \times 10^{19}$ to $1 \times 10^{21}$ defect centers per $cm^3$. This concept is taught in the above cross referenced U.S. Ser. No. 845,406 entitled "Broadband Zero Field Exchange Echo System". The other above cited cross referenced application U.S. Ser. No. 33,201 discloses a very high bandwidth-time product spin echo system utilizing a sample comprised of nickel doped rutile whereupon the crystalline electric field of the sample itself splits the energy levels of the nickel without the need for an externally applied DC magnetic field to provide a bandwidth in the order of 150MHz centered around an operating frequency of 8.25GHz.

One of the problems associated with spin echo systems, however, is that the pulse repetition frequency of the pulse sequence is limited by the spin lattice time of the material comprising the sample. Irrespective of the spacing of the time between RF pulses comprising a sequence for the production of a spin echo signal, one must wait for a time determined by the spin lattice time of the material before a thermal equilibrium of the spin system is reached before another pulse sequence can be applied to the system. For example, where the spin lattice time of nickel doped rutile at liquid helium temperatures is in the order of 10 milliseconds, the pulse sequence repetition frequency will be limited to approximately 100Hz. It should also be pointed out that the available spin bandwidth in any zero field spin echo material is an inherent property of the material itself and cannot be changed by external means without destroying the benefits associated with zero field operation.

Summary

The present invention has for its object increasing the permissible repetition rate of the pulse sequence of a spin echo system and is accomplished by utilizing a relatively high bandwidth paramagnetic sample such as nickel doped rutile which exhibits the property of zero field operation and then applying a plurality of pulse sequences to the sample wherein the RF carrier frequency of each sequence is incrementally stepped in frequency over a selected portion of the operating bandwidth of the sample and applied before a thermal equilibrium of the spin system is reached for the immediately preceding pulse sequence so that the sample provides a separate cavity for each pulse sequence applied thereto and therefore exhibits a time sharing or multiplexing mode whereby the overall repetition frequency of the system is increased by a factor corresponding to the number of frequency steps employed.

BRIEF DESCRIPTION OF THE DRAWINGS

FIG. 1 is a waveform diagram illustrative of a first and second pulse sequence of a single RF carrier frequency of a spin echo system operating in accordance with the subject invention;

FIG. 2 is a block diagram illustrative of a first embodiment of electrical apparatus for practicing the subject invention;

FIG. 3 is a waveform illustrative of the step increment change in the RF carrier frequency of a series of pulse sequences employed for example by the subject invention;

FIG. 4 is a set of waveforms illustrative of several pulse sequences each having a different RF carrier frequency according to the variation shown in FIG. 3; and FIG. 5 is a block diagram of a second embodiment of electrical apparatus for practicing the subject invention.

DESCRIPTION OF THE PREFERRED EMBODIMENTS

Referring now to the drawings and more particularly first to FIG. 2, there is disclosed a fixed frequency source 10 which is adapted to operate for example at a frequency of 8.000GHz. A second frequency source 12 which is adapted to be electronically stepped in frequency for example over the range from 200MHz to 300MHz is coupled to an RF mixer 14 which also receives an input from the fixed frequency source 10. The means for stepping the frequency of the output from the source 12 is within the purview of one skilled in the art. This control can either be internally or externally applied by means not shown. A synchronizer 16, the purpose of which is to synchronously control the overall operation of the embodiment shown in FIG. 2, has one output control signal commonly coupled to the signal sources 10 and 12 whereupon they generate simultaneous output pulses of the respective frequencies. These two output frequency pulses are coupled to and heterodyned by the mixer 14 to provide sum and difference frequency outputs therefrom. For example, where the output frequency of the source 12 is 200MHz, the output from the mixer will be RF pulses comprised of carrier frequencies of 8.2000GHz and 7.800GHz. These pulses are fed to an RF amplifier 18 where the lower or difference frequency pulse is removed such as by filtering while the other pulse (8.200GHz) is amplified to a predetermined level. The 8.2000GHz pulse is next fed into a gating circuit 20 which is also controlled by the same output signal from the synchronizer 16 coupled to the sources 10 and 12 to transmit the output of the amplifier 18 in time relationship therewith. The 8.200GHz output from the gate circuit 20 is fed into a microwave circulator 22 by means of an RF signal path 24 which may be for example a section of microwave waveguide transmission line.

A portion of the output from the gate circuit 20 is coupled to a time delay circuit 26 by means of an RF signal path 28. The output of the time delay circuit 26 is then coupled to a microwave RF pulse source 30 which is triggered by the output from the time delay circuit 26 and produces a signal pulse in time delayed relationship with the pulse applied to the gating circuit 20. The output pulse from the pulse source 30 has a bandwidth which is "flat" over the frequency spectrum of the pulse output from the mixer 14. The pulse source 30 also receives a control signal from the synchronizer 16 which function will be described subsequently. The pulse output from the source 30 which hereinafter will be referred to as the "post set" pulse is coupled back to the signal path 24 by means of a microwave coupler 32 and the signal path 34. The first pulse (8.2000GHz) and the "post set" pulse which are separated by a time $t_1$ are fed by means of the circulator 22 to a microwave signal path 36 comprising a microwave waveguide section. The waveguide section 36 is terminated in a load comprising a waveguide short 38 and is immersed in a cryostat 40, e.g. a dewar vessel which contains a cryogenic material such as liquid helium 41 for operation at extremely low temperatures ( 4°K. and below, e.g. 1.2°K.).

The waveguide section 36 in the vicinity of the short 38 contains a spin echo sample 42 comprised of paramagnetic material having the following properties: (a) the host material contains no nearest-neighbor elements to the echo producing paramagnetic defect which possess nuclear spins; (b) the resonance transition of the paramagnetic defect permits zero magnetic field operation at some microwave operating frequency which permits relatively high bandwidth time products to be achieved; (c) the phase memory time can be controlled by the doping concentration; and (d) the material exhibits a spin lattice relaxation time comparable to the memory cycle repetition period obtained in conventional memory systems. Based on these considerations, a sample of titanium dioxide or rutile doped with "non-Kramers" ions such as nickel ions ($Ni^{++}$) is utilized, for example, as the spin echo sample. Various doping levels can be selectively obtained by completely immersing the rutile host lattice in a nickel oxide (NiO) powder and heating it to 1,100°C in air for various lengths of time. The nickel ion which is in the atomic state "2+" is employed as the echo producing defect. The nearest atomic neighbors to this ion which are oxygen ions, however, contain no nuclear spins. Secondly, the crystalline electric field of the rutile doped with nickel splits the energy levels of the nickel at an operating frequency of 8.250GHz producing what is referred to as "zero field splitting" of the spins eliminating the need for an external magnetic biasing field.

In operation, the synchronizer 16 triggers the two RF sources 10 and 12 and the gating circuitry 20 immediately couples a first RF input pulse to the spin echo sample 42 by way of the circulator 22 and the signal path 36. The "post set" pulse produced by the source 30 is coupled to the sample 42 after a predetermined time delay $t_1$ whereupon a spin echo signal will be generated by the sample 42 at a second time $t_1$ after the occurrence of the "post set" pulse. The spin echo signal is fed out of the microwave transmission line 36 to the circulator 22 where it is then coupled to microwave receiver apparatus 44. The present invention additionally has for its object the generation of a correlation waveform in the form of a second echo signal by applying a second RF input pulse to the sample by triggering the RF sources 10 and 12 at a time greater than $t_1$ after the occurrence of the "post set" pulse. If used in a radar system this second input pulse would consist of the radar return from the target. In the second instance, however, the synchronizer 16 couples a disabling signal to the pulsed source 30 so that a second "post set" pulse is not produced. After a period $t_1$ after the application of the second RF input pulse to the sample 42 a second echo signal is produced which is coupled to the receiver 44.

This operation can be more readily seen by reference to FIG. 1 where there is shown a pair of pulse sequences generated at a single RF carrier frequency such as for example 8.200GHz. In the waveforms shown in FIG. 1, the first pulse 46 represents the first RF input pulse derived by mixing the pulsed outputs of the RF sources 10 and 12 wherein the source 12 is operating at 200MHz. The next pulse 48 represents the "post set" pulse generated by the source 30. The time separation between pulses 46 and 48 is $t_1$. After a second time $t_1$ following the occurrence of the "post set" pulse 48, a spin echo signal 50 will be produced. However, if the microwave receiver 44 shown in FIG. 2 is gated "off" at this time, the spin echo signal 50 will not be sensed. Following the occurrence of the first spin echo signal 50, a second RF input signal pulse 52 corresponding substantially to the first RF pulse 46 is gated to the spin echo sample 42 whereupon a correlation waveform is generated as a second echo 54 after a corresponding time $t_1$.

FIG. 1 also discloses that one must wait for a time in the order of $T_1$ (the spin lattice time of the material) before a thermal equilibrium of the spin system is reached and a second echo sequence of the same RF carrier frequency can be coupled into the system. Actually one must wait even longer to reduce the amplitude of spurious echo signals. Where for example nickel doped rutile at liquid temperatures is used as the spin echo sample, the time $T_1$ is in the order of 10 milliseconds. Therefore, the repetition rate of the pulse sequence at one RF carrier frequency (8.200GHz) will be limited to approximately 100Hz.

The present invention has for its objective the increasing of the permissible repetition rate of the system bearing in mind that each pulse sequence of one RF carrier frequency is limited by the time $T_1$. To this end the source 12 shown in FIG. 2 is stepped in frequency in increments of for example 10MHz whereupon RF pulses of 8.20, 8.21, 8.22 . . . 8.28 and 8.29GHz will be coupled out of the mixer 14. The spin echo sample 42 is configured such that there are a plurality of cavities so that for example the first sequence of pulses at a carrier frequency of 8.20GHz shown in FIG. 4A is coupled into the waveguide section 36 containing the nickel doped rutile sample 42. While waiting for thermal equilibrium to be established in this portion of the frequency band, a second sequence of pulses stepped in carrier frequency such as 8.21GHz as shown in FIG. 4B is applied to the sample. This process is repeated as the carrier frequency is stepped in 10MHz increments. Where 10 increments are provided, the overall repetition frequency of the pulse sequences can be increased by a factor of 10. Where for example a 100Hz repetition frequency was possible when a single RF carrier frequency is utilized the present invention provides a repetition rate in the order of 1KHz. The spin echo sample 42 then is time shared by overlapping pulse sequences of different RF carrier frequency.

The present invention is particularly suited to a system in which frequency "hopping" is to be accomplished in a transmitted signal of some sort because the need for a switchable mixing source would be eliminated and the different RF carrier frequencies can be read directly into the spin echo element. A typical application of this concept is shown in FIG. 5 wherein the spin echo system is utilized as a matched filter element in a frequency diversity pulsed radar system. More particularly, FIG. 5 discloses a portion of the RF portion of such a radar and comprises for purposes of illustration, a stepped carrier frequency RF radar modulator 60 which produces an RF pulse 46' which is radiated from a radar antenna 62 after having been fed through a transmitreceive (T/R) device 64. The radar modulator 60 is controlled by a synchronizer 66 which also applies a signal to a gate circuit 68 coupled to a gated radar receiver 70. A portion of the radiated radar pulse 46' is coupled by means of a microwave coupler 72 to a microwave transmission line 74 which terminates in a circulator 76 which has one arm coupled to waveguide transmission line apparatus 78 which is enclosed in a cryostat 80 and including a nickel doped rutile sample 82. A portion of the radiated pulse 46' traveling along the transmission line 74 is coupled therefrom by means of a second microwave coupler 84 where it is fed to a time delay circuit 86 and thence to a "post set" pulse source 88 which is triggered to produce a "post set" pulse 48'. The "post set" pulse 48' is coupled back through the transmission line 74 by means of a third microwave coupler 90 whereupon the combination of the portion of the radar output pulse 46' and the "post set" pulse 48' traveling in the transmission line 74 is applied to the nickel doped rutile sample 82. A spin echo signal such as shown by reference numeral 50 in FIG. 1, is produced and fed out of the circulator 76 to the receiver 70. However, the receiver 70 is gated "off" by the gate circuit 68 therefore this signal will not be utilized. The received radar pulse 52', however, incident on the antenna 62, is immediately coupled from the T/R device 64 to the transmission line 74 by means of a fourth microwave coupler 92 where it is applied to the spin echo sample 82 causing a correlation waveform of the radiated pulse as an echo 54'. The receiver 70 meanwhile has been gated "on" by the gate circuit 68 so that the echo signal 54' is sensed thereby and coupled to circuitry, not shown, for suitable signal utilization. What is significant, however, is that the pulse repetition frequency of the spin echo system is compatible with the radar apparatus. Since a nickel doped rutile spin echo sample possesses an inherent relatively wide bandwidth of 150MHz; however, a signal bandwidth of only 5MHz is required for any carrier frequency radiated. Therefore the radar modulator 60 can be stepped as previously described and the spin echo apparatus will serve as a matched filter for the radar receiver 70.

Having thus described which is at present considered to be the preferred embodiments of the subject invention, bearing in mind that the present specification has been presented for purposes of explanation and is not to be interpreted in a limiting sense,

We claim as our invention:

1. A spin echo system wherein an RF pulse sequence comprised of at least two RF pulses is applied to a sample of paramagnetic material selectively doped for producing an echo signal, comprising in combination:

microwave circuit means located in a cryogenic atmosphere and adapted to couple RF signals to and from said sample;

a spin echo sample located in said microwave circuit means and having a plurality of cavity modes in its spin lattice for exhibiting a relatively large bandwidth in relation to the bandwidth of the RF carrier frequency of the first pulse of a spin echo pulse sequence;

means for producing a plurality of RF pulse sequences with the frequency of at least the first RF pulse of each sequence selected to be different from the frequency of the first pulse of the preceding sequence and the second RF pulse of each sequence having a bandwidth which includes the frequency of the first pulse of the corresponding sequence; and means for sequentially coupling said plurality of pulse sequences to said sample in timed relationship for producing a spin echo signal in response to each pulse sequence so that the respective pulse sequences after the initial pulse sequence are applied before the thermal equilibrium of the spin system is reached for the preceding pulse sequence.

2. The invention as defined by claim 1 wherein said microwave circuit means comprises waveguide means including a load at one end thereof which is in said cryogenic atmosphere.

3. The invention as defined by claim 1 wherein said spin echo sample comprises titanium dioxide doped with nickel to a predetermined concentration such that a bandwidth in the order of 150MHz is provided and said second RF pulse comprises a "post set" pulse.

4. The invention as defined by claim 1 wherein the carrier frequency of at least the first pulse of each sequence is stepped in equal increments over a predetermined frequency band within the bandwidth of the spin echo sample.

5. The invention as defined by claim 1 wherein said means for producing a plurality of RF pulse sequences includes a fixed frequency source and a variable frequency source adapted to be selectively changed in selected frequency increments over a predetermined frequency band, and a mixer coupled to both said fixed and variable frequency source for heterodyning the output frequency thereof to thereby provide the carrier frequency of at least the first pulse of each pulse sequence.

6. The invention as defined by claim 5 wherein said fixed frequency source operates in the microwave frequency range and said variable source operates in the VHF frequency band.

7. The invention as defined by claim 1 and additionally including a cryostat operating in the temperature range including the temperature of liquid helium for providing said cryogenic atmosphere.

8. The invention as defined by claim 1 wherein said cryogenic atmosphere includes means for reducing the temperature of said spin echo sample to a temperature within the temperature range of 1.2°K. to 4.2°K.

9. The method of increasing the repetition rate of a spin echo system comprising the steps of:
locating a spin echo sample having a relatively large bandwidth in relation to the bandwidth of the RF carrier frequency of the first pulse of an RF pulse sequence utilized for the production of a spin echo signal in a microwave transmission line;
producing a plurality of diverse frequency RF pulse sequences wherein the carrier frequency of at least the first pulse of each sequence is selectively changed between adjacent sequences and a second RF pulse having a bandwidth which includes the carrier frequency of the first pulse of said plurality of pulse sequences; and
sequentially coupling said plurality of pulse sequences to said spin echo sample in timed relationship for producing a spin echo signal for each pulse sequence such that respective pulse sequences after the initial pulse sequence are applied before the thermal equilibrium of the spin system is reached for the preceding pulse sequence.

* * * * *